United States Patent [19]
Rao

[11] 4,269,570
[45] May 26, 1981

[54] ELASTOMERIC MOUNTING FOR WAVE COMPRESSOR SUPERCHARGER

[75] Inventor: V. Durga N. Rao, Bloomfield Hills, Mich.

[73] Assignee: Ford Motor Company, Dearborn, Mich.

[21] Appl. No.: 32,198

[22] Filed: Apr. 23, 1979

[51] Int. Cl.³ .............................................. F04F 11/00
[52] U.S. Cl. ..................................................... 417/64
[58] Field of Search ...................... 417/64; 60/39.45; 418/152, 153; 403/359, 372

[56] References Cited

U.S. PATENT DOCUMENTS

| | | | |
|---|---|---|---|
| 2,235,605 | 3/1941 | Bugatti | 403/359 X |
| 3,101,168 | 8/1963 | Berchtold | 417/64 |
| 3,120,919 | 2/1964 | Gardiner | 417/64 |
| 3,291,379 | 12/1966 | Herger et al. | 417/64 |
| 4,059,370 | 11/1977 | Gibson | 418/152 X |

*Primary Examiner*—Carlton R. Croyle
*Assistant Examiner*—Edward Look
*Attorney, Agent, or Firm*—Donald J. Harrington; Frank G. McKenzie

[57] ABSTRACT

A turbocompressor for use in transferring the energy of the exhaust gases for a liquid fuel combustion engine to the intake air for the engine including a rotor formed of ceramic material, a rotor with a rotor shaft extending through the hub of the rotor and an elastomeric driving connection between the shaft and the rotor hub whereby the elastomeric material is capable of cushioning the rotor, exerting on the rotor stresses that oppose centrifugal stresses induced in the ceramic and acting as a heat dam between the hub and the gas and air cells at a radially outward region of the rotor.

4 Claims, 7 Drawing Figures

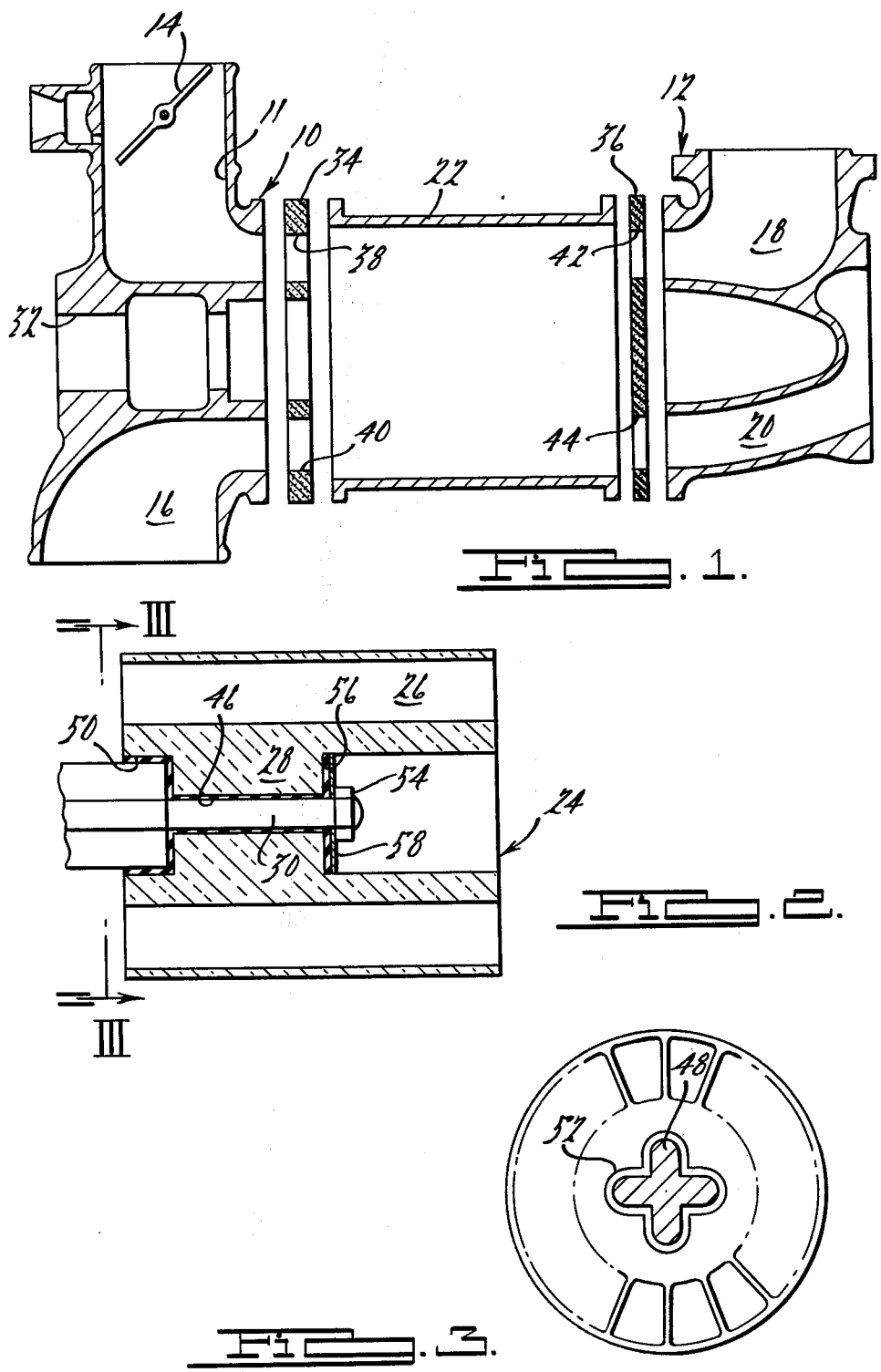

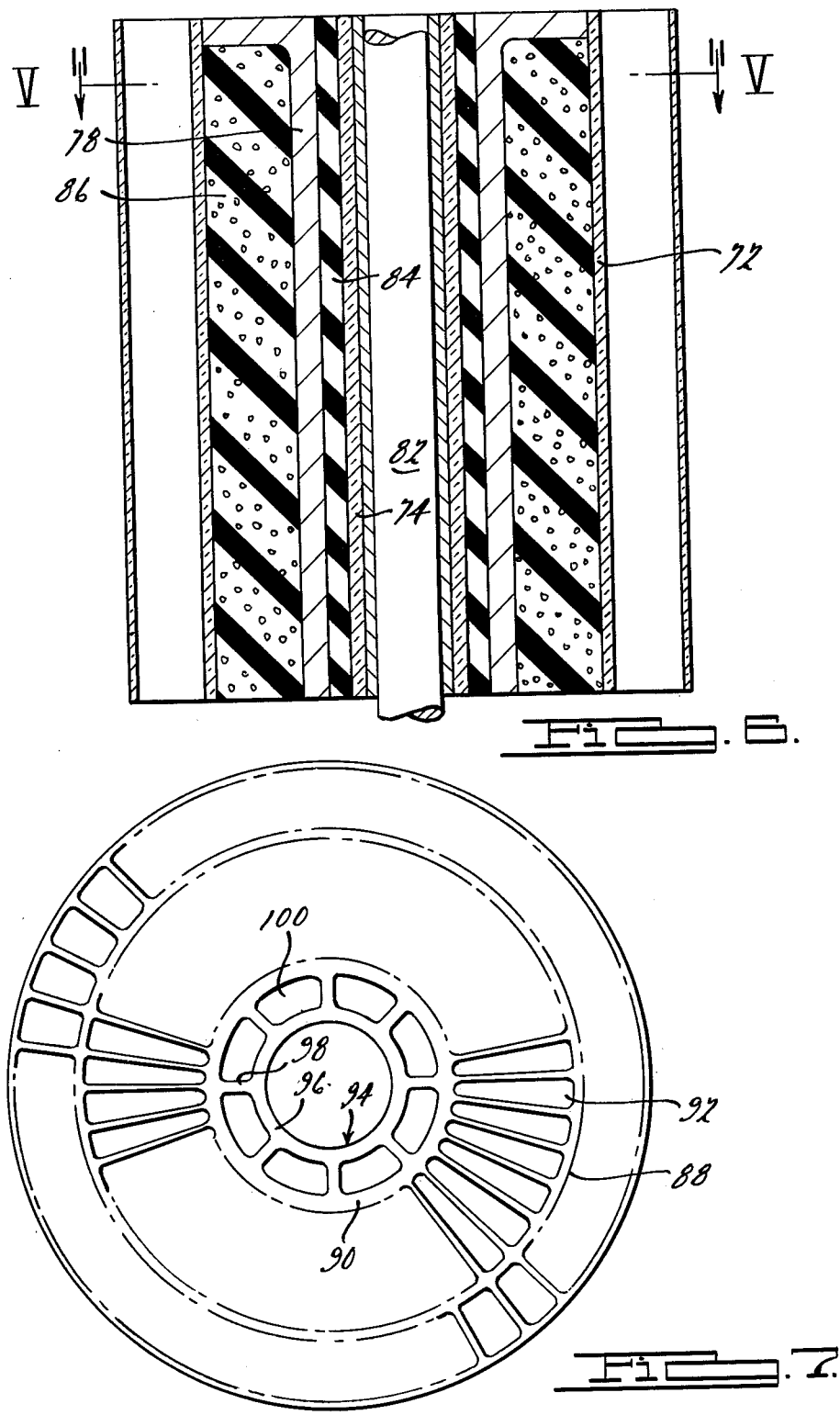

ELASTOMERIC MOUNTING FOR WAVE COMPRESSOR SUPERCHARGER

BRIEF DESCRIPTION OF THE INVENTION

My invention comprises improvements in a compression wave turbocharger of the type described in an ASME publication entitled "Performance and Sociability of Comprex Supercharged Diesel Engine" by Groenwold et al, published in September 1977. It is an improvement also in the turbo supercharger disclosed in my co-pending application Ser. No. 032,324, filed Apr. 23, 1979, entitled "Wave Compressor Supercharger", which is assigned to the assignee of my present invention.

A wave compressor supercharger of the kind described in the aforementioned ASME publication and in my co-pending application includes a rotor having a plurality of axially extending gas and air channels or cells. The rotor is mounted on a shaft, and port plates or stators are situated on either axial side of the rotor to provide controlled communication between the cells of the rotor and the gas and air ports.

The high pressure exhaust gas inlet port and the low pressure exhaust gas outlet port are located on one side of the rotor and communicate with the rotor cells through ports formed in the adjacent stator. A low pressure air inlet port and a high pressure air outlet port are located on the other axial side of the rotor and communicate with the rotor cells through ports formed in the other stator. The high pressure exhaust gas establishes a compression wave front in the cells which compresses the low pressure inlet air. The compressed inlet air is discharged into the high pressure air port.

The porting is designed so that the high pressure exhaust gas port, the low pressure exhaust gas port, the low pressure air inlet port and the high pressure air outlet port are opened and closed in timed sequence so that the pressure wave established by the opening of the high pressure exhaust gas port establishes a charge of compressed air in each of the cells without reflection of the wave front off the stator wall at the end of the rotor cell. The timed opening and closing of the ports causes the air cells to be charged with low pressure air and an exhausting of the low pressure exhaust gases into the low pressure exhaust passage of the exhaust manifold. This turbo compressor wave action creates an elevated temperature in the rotor cells, and for this reason it is desirable to form the rotor and the shroud of the ceramic materials such as those described in my co-pending application identified above. Such ceramic materials are capable of withstanding the operating temperatures and are characterized by relatively low coefficients of expansion so that close running tolerances can be maintained in the turbo charger.

The improved mounting mechanism of my invention makes it possible for the ceramic rotor to be insulated with respect to the shaft so that vibrations can be isolated from the ceramic rotor structure, thus preventing damage to the ceramic. Also the elastomeric portions of the mounting structure are capable of establishing in the ceramic compressive stresses that act in opposition to centrifugal stresses on the ceramic thereby reducing the possibility of failure of the ceramic due to overstressing. Provision is made also for improving the heat insulation characteristics of the assembly so that a heat dam is created between the relatively hot channels or cells of the rotor and the hub of the rotor thereby permitting the hub to operate at relatively cool temperatures.

BRIEF DESCRIPTION OF THE FIGURES OF THE DRAWINGS

FIG. 1 shows in schematic form a turbocharger with the principal elements on the turbocharger separated, one with respect to the other, for purposes of clarity.

FIG. 2 shows a rotor which is a part of the turbocharger shown in FIG. 1.

FIG. 3 is an end view of the rotor of FIG. 2 as seen from the plane of section line 3—3 of FIG. 2.

FIG. 6 is a cross-sectional view of the rotor of FIG. 5 as seen from the plane of 6—6 of FIG. 5.

FIG. 7 is a cross-sectional view showing another form of rotor design for use in an assembly of the type shown in FIG. 1.

PARTICULAR DESCRIPTION OF THE INVENTION

Figure 4:
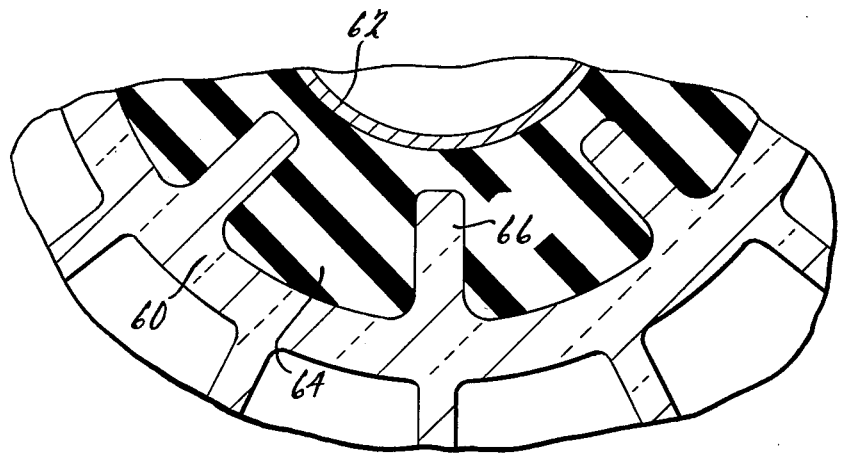
FIG. 4 is a cross-sectional view of a rotor of an alternate design.

In FIG. 1 reference numeral 10 designates an air intake manifold for an internal combustion engine. Numeral 12 designates generally an exhaust gas manifold for the engine. The manifold 10 includes a high pressure air intake passage 11 that is in communication with the throat of an engine carburetor. A throttle blade 14 is situated in the throat to control the rate of flow of air to the engine through the manifold. A low pressure air intake passage 16 also is formed in the manifold 10.

The exhaust gas manifold 12 includes a high pressure exhaust gas passage 18 and a low pressure exhaust gas passage 20. A cylindrical shroud 22 is situated between the manifolds 10 and 12. A rotor, illustrated in FIG. 2 at 24, is adapted to be mounted for rotation in the shroud 22. The rotor is formed with axially situated channels or cells 26 and with a hub 28 that is mounted on a mounting or support shaft 30, the latter being secured in a shaft opening 32 in the manifold 10. A suitable bearing arrangement can be provided in the manifold 10 to permit free rotation of the shaft 30.

The cells 26 communicate with the passages 16, 12, 18 and 20 through ports formed in stator plates 34 and 37. Stator 34 is located between the shroud 22 and the manifold 12. Stator 34 is provided with a high pressure air outlet port 38 and a low pressure air inlet port 40. Stator 36 is provided with a high pressure exhaust gas inlet port 42 and with a low pressure exhaust gas outlet port 44. These ports communicate with the channels or cells 26 in the rotor in timed sequence, as explained in the above identified application, to accommodate movement of a body of low pressure inlet air and a body of exhaust gases through the rotor. The energy of the exhaust gases admitted to the cells through the port 42 is transferred to the low pressure inlet air in the cells. The compression wave front thus established compresses the inlet air and discharges it through the port 38 to the high pressure air passage 11. The expanded and relatively cool exhaust gases are discharged from the cell through the port 44 to the passage 20 as a charge of low pressure inlet air is admitted to the appropriate cell through the port 40 to begin the next compression cycle.

In the embodiment shown in FIGS. 2 and 3 the hub 28 of the rotor is provided with a central shaft opening 46 through which the shaft 30 extends. Shaft 30 is provided with radially disposed flanges 48 which register with slots 50 in the left hand end of the hub 28, thus providing a drive means for transferring driving torque from the shaft to the rotor. An elastomeric material 52 is disposed between the flanges 48 and the slots 50 to provide a cushioning action, thus preventing or reducing the transfer of undesirable vibrations from the shaft to the ceramic rotor. A clamping nut 54 can be threaded on the shaft 30 to hold the hub 28 fast on the shaft. The elastomeric material is situated in the clearance between the shaft 30 and the ceramic cylindrical wall of the hub 28 as well as on the end surface 56 of the hub 28 against which a clamping washer 58 is positioned.

In FIG. 4 I have shown an alternate mode of construction that comprises a ceramic hub 60 and a hollow shaft 62, which is formed of metal. A solid elastomer 64 is situated between the shaft 62 and the hub 60. By preference the hub 60 is provided with radially disposed projections 66 which facilitate transfer of torque between the shaft and the hub 60. The elastomer is a silicon base elastomer such as dimethylsiloxane, and it has a coefficient of thermal expansion of about 100 times the coefficient of thermal expansion of the ceramic. The metal shaft 62 has a coefficient of thermal expansion about 10 times the coefficient of thermal expansion of the ceramic.

The elastomer is introduced into the space between the ceramic hub 60 and the metal shaft and is cured at a temperature that is less than the service temperature. For example, it might be cured at a temperature of about 300° F. whereas the service temperature for the cells of the rotor might reach temperatures as high as 700° F. When the assembly is cooled to room temperature after curing, the elastomer shrinks and tends to pull away from the surrounding walls of the hub 60, thereby placing the hub under compression. When the rotor then is operated at a relatively high operating speed, the compressive stresses in the hub are opposed by centrifugal tensile stresses so that the resulting or net stresses are of a lower value than those stresses that would occur if this prestressing in the elastomer where not present.

Figure 5:
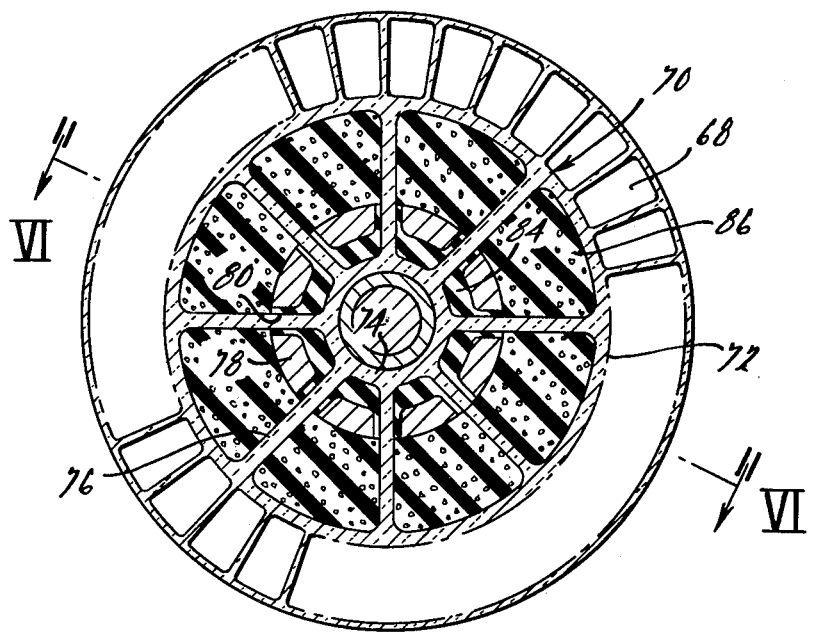
FIG. 5 is a cross-sectional view of a rotor that includes an elastomeric sponge heat dam as seen from the plane of section line 5—5 of FIG. 6.

In the embodiment shown in FIGS. 5 and 6 the rotor is comprised of cell portions 68. The hub is generally identified by reference character 70. The hub comprises concentric cylindrical portions 72 and 74 which are connected by radial rim portions 76. The hub portions 72, 74 and 76 and the cell portions 68 are formed as an integral ceramic part. The driving shaft 78 extends through the hub at a location between the cylindrical portions 72 and 74. The shaft 78 is slotted, as shown at 80, to permit the radial portions 76 to extend therethrough in a radial direction. A drive shaft 82 extends through the center of the cylindrical hub portion 74. Shaft 82 may be clamped or keyed to the shaft 78 or drivably coupled to the rotor.

The silicon based elastomer is introduced in solid form between the cylindrical portion 74 and the inside surface of the shaft 78 as shown at 84. The elastomer extends also through the slots 80 so that the shaft 78 is isolated from the radial ceramic portions 76. An elastomer sponge material 86 is located in the spaces between the drum 72 and the outside surface of the shaft 78. The elastomer sponge can be secured to the walls of the cylindrical portion 72 and the walls of the radial portions 76 as well as the outer wall of the shaft 78 by a room temperature vulcanizing silicone adhesive.

The elastomer material of the FIG. 5 construction is cured at a temperature substantially below the service temperature. When the rotor is operated and the temperature reaches its stabilized value during operation, for example, 700° F. maximum at the outer extremities of the rotor, the elastomer expands because it has a substantially higher coefficient of thermal expansion than the coefficient of thermal expansion of the metal. The ratios of these expansion coefficients might be 10 to 1. The thermal expansion of the ceramic itself might be 1/100 the coefficient of thermal expansion of the elastomer. Because of these differentials in the coefficients of thermal expansion, the hub of the rotor is placed under compressive stresses. These compressive stresses oppose the centrifugal stresses induced in the ceramic during operation of the rotor at high speeds. Failures of the rotor due to centrifugal force stresses thus are eliminated or reduced in number.

The elastomer sponge material 86 thermally isolates the hot portions on the periphery of the rotor from the hub portions. It serves as a heat dam because of the air spaces within the sponge material. The sponge elastomer is commercially available as is the solid elastomer 84. The composition of and method for preparing the elastomer and the elastomer sponge are known from U.S. Pat. Nos. 4,148,354 and 4,150,085, the disclosure of which are hereby incorporated by reference.

If the rotor is cooled to room temperature below the curing temperature, the resulting contraction of the elastomer relative to the ceramic places the hub of the rotor in compression, which again opposes any centrifugal stresses that are developed in the rotor during operation. Thus the rotor is isolated from shaft vibrations, and it is protected from excessive centrifugal stresses and from overheating due to heat transfer from the radially outward cells.

FIG. 7 shows still another rotor design which comprises an outer cylindrical rim 88 and an inwardly spaced concentric portion 90. The cells 92 for the rotor are disposed axially between the portion 90 and the rim portion 88. The hub portion 94 of the rotor of FIG. 7 comprises an inner cylindrical part 96 and radial portions 98 that bridge the portion 96 and the portion 90. Spaces 100 are located between the radial portions 98 for accommodating the shaft, the solid elastomer and the sponge elastomer as indicated in the embodiment of FIGS. 5 and 6. The cells of the FIG. 7 embodiment are longer in a radial direction than the cells in the embodiment of FIGS. 5 and 6 which results in a smaller cavity for accommodating the elastomer.

Having described preferred embodiments of my invention, what I claim and desire to secure by U.S. Letters Patent is:

1. A rotor for a wave compressor for use in transferring energy from relatively high pressure, high temperature exhaust gases to low pressure, cool inlet air for an air-fuel mixture engine comprising a rotor adapted to be rotabaly mounted between an exhaust gas manifold having high pressure exhaust gas and low pressure exhaust gas outlet ports and an air intake manifold having a high pressure air outlet passage and a low pressure air inlet passage, said rotor comprising a hub and gas and air cells located radially outwardly with respect to the hub and defining axial gas and air flow passages, said hub having a cylindrical inner portion that forms a part of and is integral with the cell portion of the rotor, said rotor being formed of a ceramic material of relatively low thermal expansion, a metallic shaft extending through the hub inner portion sized to produce a space located between said shaft and the inner portion of said hub and an elastomer of silicon base disposed in said space, said elastomer being bonded to said shaft and to said ceramic whereby a driving connection is established between said shaft and said ceramic, said rotor being formed of a ceramic material having a low thermal expansion coefficient relative to said shaft and said elastomer.

2. The combination as set forth in claim 1 wherein an elastomer sponge material is located between the radially innermost hub portion and said cells, said elastomer sponge material acting as a heat dam opposing transfer of heat from the cells to the hub of the rotor and being structurally joined to the hub portion at the cure temperature of the elastomer, whereby residual compressive stresses are induced in the hub at temperatures less than the cure temperature.

3. A ceramic rotor adapted to be mounted on a metal shaft in a turbocompressor, said turbocompressor being situated between an exhaust gas manifold and an air intake manifold for a fuel-air mixture engine, said rotor having a peripheral portion with axially disposed ceramic cells adapted to accommodate movement therethrough of low pressure air and relatively high pressure heated exhaust gases whereby transfer of energy from the exhaust gases to the air takes place as the air is delivered from a low pressure air inlet port to a high pressure air outlet port, said rotor comprising also a hub, said hub having concentric cylindrical portions and radially disposed portions connecting the cylindrical portions, a metallic shaft extending through said hub at a location intermediate said concentric hub portions, said shaft having axially directed apertures, said radially disposed ceramic portions extending through said apertures, a silicon base elastomer located between the radially innermost cylindrical hub portion and said shaft and between said shaft and said radially extending ceramic portions whereby compressive stresses are established on said hub portion by reason of the relatively high coefficient of thermal expansion of said elastomer relative to the coefficient of thermal expansion of said ceramic.

4. The combination as set forth in claim 3 wherein an elastomer sponge material is located between the radially innermost hub portion and said cells, said elastomer sponge material acting as a heat dam opposing transfer of heat from the cells to the hub of the rotor and being structurally joined to the hub portion at the cure temperature of the elastomer, whereby residual compressive stress are induced in the hub at temperatures less than the cure temperature.

* * * * *